(12) United States Patent
Kinisky et al.

(10) Patent No.: US 6,258,136 B1
(45) Date of Patent: Jul. 10, 2001

(54) FIXED ABRASIVES FOR OPTICAL POLISHING

(75) Inventors: Thomas G. Kinisky, Shrewsbury, MA (US); Gwo Shin Swei, East Amherst, NY (US); Dean B. Arvidson, Jr., Westborough, MA (US); Ronald W. Laconto, Sr., Leicester, MA (US); Rami Schlair, Newton, MA (US)

(73) Assignee: Norton Company, Worcester, MA (US)

( * ) Notice: Subject to any disclaimer, the term of this patent is extended or adjusted under 35 U.S.C. 154(b) by 0 days.

(21) Appl. No.: 09/361,438

(22) Filed: Jul. 26, 1999

Related U.S. Application Data

(63) Continuation-in-part of application No. 09/025,730, filed on Feb. 18, 1998, now Pat. No. 5,989,301.

(51) Int. Cl.[7] ............................. B24D 3/00; B24D 11/00; B24D 17/00
(52) U.S. Cl. ................. 51/298; 51/295; 51/309
(58) Field of Search ............................. 51/295, 298, 309

(56) References Cited

U.S. PATENT DOCUMENTS

| | | |
|---|---|---|
| 3,429,080 | 2/1969 | Lachapelle . |
| 4,106,915 | 8/1978 | Kagawa et al. . |
| 4,161,394 | 7/1979 | Regan Glen et al. . |
| 4,576,612 | 3/1986 | Shukla et al. . |
| 4,601,755 | 7/1986 | Melard et al. . |
| 5,429,647 * | 7/1995 | Larmie ................................. 51/309 |
| 5,465,314 | 11/1995 | Jie Xu et al. . |
| 5,500,273 * | 3/1996 | Holmes et al. ......................... 51/295 |
| 5,632,668 | 5/1997 | Lindholm et al. . |
| 5,693,239 | 12/1997 | Wang et al. . |
| 5,697,992 | 12/1997 | Ueda et al. . |
| 5,702,811 * | 12/1997 | Ho et al. ............................... 51/295 |
| 5,752,996 * | 5/1998 | Wood .................................... 51/309 |
| 5,804,513 | 9/1998 | Sakatani et al. . |
| 5,833,724 * | 11/1998 | Wei et al. ............................. 51/295 |
| 5,851,247 * | 12/1998 | Stoetzel et al. ....................... 51/295 |
| 5,876,268 | 3/1999 | Lamphere et al. . |
| 5,876,470 * | 3/1999 | Abrahamson ......................... 51/309 |
| 5,910,471 | 6/1999 | Christiansen et al. . |
| 5,954,844 * | 9/1999 | Law et al. ............................. 51/295 |

FOREIGN PATENT DOCUMENTS

| | | |
|---|---|---|
| 608730 | 8/1994 | (EP) . |
| 745656 | 12/1996 | (EP) . |
| 826757 | 3/1998 | (EP) . |
| 10183104 | 12/1996 | (JP) . |
| WO97/43087 | 11/1997 | (WO) . |

* cited by examiner

*Primary Examiner*—Michael Marcheschi
(74) *Attorney, Agent, or Firm*—David Bennett

(57) ABSTRACT

An optical polishing tool comprises alpha alumina and ceria components in relative weight proportions of from 30:70 to 70:30 dispersed in a resin binder. Particularly preferred are coated abrasives. Such coated abrasives produce an improved optical polishing performance.

14 Claims, 3 Drawing Sheets

FIXED ABRASIVES FOR OPTICAL POLISHING

This application is a continuation-in-part of application Ser. No. 09/025,730 filed Feb. 18, 1998 U.S. Pat. No. 5,989,301.

BACKGROUND TO THE INVENTION

The present invention relates to products useful in polishing optical surfaces. The surface polished can be glass or plastic.

It is well known that in order to produce a satisfactory optical surface, it is necessary that the surface be free of scratches and have as low an $R_a$ as possible. This $R_a$ measurement is the average distance between the highest and lowest points on the surface perpendicular to the plane of the glass sheet being polished. Thus, accepting that the surface will not be totally flat at the submicron scale, it is a measure of the variation between highest and lowest points. Clearly the lower the figure the better for optical clarity and freedom from distortion.

There is however another consideration and that is the speed at which the desired level of optical perfection is reached. Glass polishing is a chemical mechanical process that only proceeds in an aqueous environment. It is necessary for the polishing compound to react with the glass surface and the water, as well as the surface to be subject to abrasion. Some materials such as ceria are quite reactive but not very abrasive. Others such as alumina are quite abrasive but do not have much surface reactivity. This subject is well treated in an article by Lee Clark entitled "Chemical Processes in Glass Polishing" appearing in Journal of Non-Crystalline Solids 120 (1990), 152–171. In an industrial environment, there is a significant advantage in finishing the process in shorter rather than longer times, particularly when no quality sacrifice is required and or where quality can be improved.

In polishing processes there are two approaches. The first employs an abrasive formulation in the form of a slurry of the abrasives in a liquid medium. In the second the formulation is presented to the glass in the substrate to be polished in the form of a tool. This tool can be a bonded abrasive or a coated abrasive particularly one in which the coated abrasive surface is engineered to have properties that enable it to provide a very high uniformity of surface quality. It is with this latter approach that this invention is concerned.

In processes that use a slurry of abrasive particles in an aqueous medium, (usually based on deionized water), the slurry is placed in contact with the surface to be polished and a pad is caused to move across the surface in predetermined patterns so as to cause the abrasive in the slurry to polish the surface. In the second the abrasive particles are embedded in a resin matrix in the form of a tool and the tool is then used to polish the optical surface. The present invention relates to the first approach in which slurries are used.

U.S. application Ser. No. 09/025,730 U.S. Pat. No. 5,989,301 which was filed on Feb. 18, 1998 describes aqueous slurries comprising alpha alumina with a particle size of less than 0.5 micrometer and ceria in the form of a powder with sizes from 0.2 to 4 micrometers.

Tools comprising abrasive particles for optical polishing are somewhat limited by the requirement of excellent finish. While in theory bonded tools, that is to say tools in which the particles are retained in a bond material and the overall tool is given a predetermined shape such as a wheel or a stick, are not easily presented to the workpiece in a suitable form there have been developments in this field which now make this practicable. Coated tools are however recognized to be readily adapted to this application and coated tool products formulations comprising very fine solid particles retained in a binder that is a radiation-curable resin and deposited on a smooth substrate have proved very successful. Such coated tools have been described in for example U.S. Pat. No. 5,011,513 (Zador et al.) and U.S. Pat. No. 5,014,468 (Ravipati et al.). The Ravipati et al. patent represents a complete departure from traditional coated abrasives in which a substrate receives an abrasive grain either dispersed in a binder, (as in Zador et al.), or adhered by separately applied maker and size coats. In fact the workpiece is presented with an engineered surface comprising regular, similar, raised structures with void spaces between wherein the abrasive particles are very small by comparison with the size of the structures. This allowed the product to achieve excellent finishes quite quickly. Other later examples of engineered surfaces that can be used in the same fashion are described in, for example, U.S. Pat. No. 5,152,917 (Pieper et al.); U.S. Pat. No. 5,833,724; (Wei et al.) and U.S. Pat. No. 5,840,088 (Yang et al.).

Polishing tools are used in conjunction with a liquid medium sprayed on to the surface while the tool is polishing so as to provide the "chemical" portion of the chemical/mechanical polishing process, (sometimes abbreviated to "CMP").

Success in polishing glasses is of course to some extent dependent on the hardness of the glass. With very hard glasses polishing can take a very long time indeed and raises finish problems if the obvious expedient of using a harder abrasive is tried.

The formulations of the prior art are often very effective at achieving the desired result. However they also take quite a long time. A novel formulation has now been developed, where two oxides, "alumina and ceria", work together in synergy, such that their mutual interaction gives better results than the sum of any single component effects. This formulation permits a very high level of optical perfection to be achieved in a much shorter time than is attainable with such prior art formulations without the need for the elevated temperatures sometimes used to enhance reactivity. In addition they polish even hard glasses very effectively with little or no collateral damage to the surface. They can be used with "pad" or "pitch" type polishing apparatus or in polishing tools, particularly coated abrasives with engineered surfaces.

GENERAL DESCRIPTION OF THE INVENTION

The present invention provides an abrasive optical polishing tool which comprises alpha alumina and ceria particles in an alumina to ceria ratio of from 95:5 to 75:25 and more preferably from 90:10 to 80:20 dispersed in hardened resin binder. The alpha alumina particles preferably have a mean particle size of 0.5 micrometers or less and more preferably from 0.10 to 0.25 micrometers and the ceria is present as particles with mean particle sizes of from 0.2 to 4 micrometers.

The polishing tool can have the form of a coated abrasive with the abrasive-containing structure bonded to a backing material but it can also have the form of a bonded abrasive or a composite abrasive. While these latter have not hitherto been associated with optical polishing, this practical division is no longer rigid. Thus abrasive wheels with organic bond materials have been tried for fine polishing applications as have products in which the abrasive particles are bonded to the fibers of an open fibrous structure using a resin bond, (commonly called "composite abrasives"). The most frequently encountered embodiments of this invention are however most typically coated abrasives.

A coated abrasive optical polishing tool can be product with a uniform coating of a layer comprising the abrasive particles dispersed in a hardened binder resin adhered to a backing material in a layer of uniform thickness or in a form presenting an engineered surface. In the context of this Application an engineered surface is one that has been shaped or formed in such a way that it comprises a plurality of repeating, often but not necessarily, similar structures deposited on and adhered to a backing material in a more or less regular array. The structures comprise abrasive particles of alumina and ceria dispersed in a hardened binder resin. The structures can be completely separated or they can abut other structures on some or all sides. Typically they decrease in thickness with increasing distance from the backing material to which they are bonded. The essence of an engineered surface is that it is constructed such that a workpiece to which the tool is presented contacts a spaced array of grinding points each provided by the top of one of the structures with room between the structures for abraded material to be conveyed away from the point at which it was generated. Usually there is between the structures an area devoid of binder or abrasive. This is a highly preferred feature since it allows the material to flex unimpeded by any rigid cured resin in such areas. The structures should be spaced and located such that the result of the contact is not scratches but a uniformly polished surface. This can be accomplished by arranging that, in the direction of relative movement between the tool and the surface being polished, the structures are arrayed such that any scratches caused by an initial contact of structure with surface are eliminated by subsequent contacts.

In preferred formulations the alumina is in the form of particles that are essentially completely submicron in size and wherein the mean particle size is less than 0.5 micron and most preferably from 0.10 to 0.25 micron. In the context of this Application, it is understood that the "mean particle sizes" discussed are the "$D_{50}$" values measured using a HORIBA L-910 particle size analyzer. Such aluminas are obtainable for example using the process described in U.S. Pat. No. 4,657,754.

Commercially available ceria is generally a mixture of rare earth metal oxides with ceria as the largest component. Other components can include neodymia, samaria, praeseodymia and lanthana. Other more minor amounts of the other rare earths may also be present. In practice it is found that the purity of the "ceria" does not greatly affect the performance of the abrasive particles in the polishing application so that the property found useful in this invention would appear to be shared to a greater or lesser extent by all the other rare earth metal oxides that appear with ceria in commercial materials sold under that name. For the purposes of this description, rare earth metal oxides mixtures in which ceria is the dominant component, (that is at least 50%), in terms of weight percentage in the product, will be referred to as "ceria". Examples of commercial sources of "ceria" include "50D1" and "SUPEROX 50" (both available from Cercoa PenYan N.Y.) which contains about 75% and 34% ceria respectively; and "RHODOX 76" (from Rhone Poulenc) comprises about 50% of ceria.

As commercially available, ceria is usually in the form of particles with bicomponent particle size distribution with peaks around particle sizes of 0.4 and 4 microns, with the larger size providing the bulk of the particles. This gives an overall $D_{50}$ value for the powder of less than 4, and usually from 3–3.5 microns. It is found that if this distribution is reduced by milling the ceria to a relatively uniform particle size around 0.2 micron and more preferably around 0.4 micron, the performance of the formulation is not greatly affected unless the glass is particularly hard and a high level of visual perfection is also required. In these circumstances the unground particle size distribution is often found to be more effective.

While the purpose of the invention is polishing the particles of the formulation are very widely known as "abrasives" and this term will be used throughout to refer to either or both even though material removal is not the focus of the polishing operation.

The product according to the invention is preferably presented to the workpiece in the form of a coated product in which the abrasive particles are dispersed within a binder resin which is preferably a radiation-curable resin. In the context of this Application it is understood that "radiation curable" refers to resin formulations comprising a binder precursor material that can be caused to polymerize by an addition process under the influence of radaition which may be ultraviolet (UV), visible light or electron beam radiation. Such resins include acrylate, (including methacrylate), polymers and copolymers as well as mixtures of such polymers with other components such as epoxy resins and flexibilizing resins such as rubbers. In order for the resin bond to have the necessary toughness, it is conventional to manipulate the amount of cross-linking within the bond by the incorporation of di-, tri- and even polyacrylated monomers or oligomers. It is also conventional to add chain terminators such as N-vinyl pyrrolidone. The cure of the bond can be accelerated or even initiated by a photoinitiator and this is often a preferred feature of the invention.

The coated abrasive is preferably one with an engineered surface. As indicated earlier an "engineered surface" is one which provides a plurality of regular, shaped structures comprising the abrasive formulation retained within a binder with the structures being adhered to a substrate or backing material. The whole coated abrasive is conventionally, but not essentially, flexible. The substrate is often a polymeric film so as to provide the greatest possible flexibility and surface uniformity. However certain fabrics and/or paper substrates can also be used. The binder used in preferably selected form the same resins described above in the context of bonded tool options and for the same reasons. It is however within the purview of this invention to provide the formulation retained in a bond that is a conventional coated abrasive bond such as an epoxy resin, a urea/formaldehyde resin, or even a phenol/formaldehyde bond. It is also possible to use a coated abrasive with a non-engineered surface that is essentially flat.

In a preferred form of the invention the surface of the optical polishing product is dusted lightly with a functional powder which is defined as a powder that provides an added function or capability. In addition to this added function or capability, the functional powder becomes embedded in the surface of the deposited layer and acts to increase the viscosity of the surface layer of the formulation such that, after embossing, there is a reduced tendency for the embossed shape to lose its dimensions in the time it takes to cure the resin component.

The functional powder could be a grinding aid or a lubricant though such additives are not generally useful in optical polishing. More frequently it is an abrasive powder which initiates the polishing action very quickly without the need for a break-in period before the abrasive particles in the formulation are exposed in sufficient numbers to have more than a modest effect. The abrasive particles are preferably no smaller than the particles dispersed in the binder and often they are larger. In the present invention the preferred functional powder is in fact alumina alone with a particle size that is lightly larger than the corresponding alumina particles in the binder/abrasive formulation.

The engineered surface could also be formed by depositing a large number of isolated individual shaped composites with the above abrasive/binder composition on a substrate and adhering them to the substrate using a maker coat. More usually it may be formed by a rotogravure process, a shape-in-mold process, or an embossing process. The latter process is preferred for optimum results.

DRAWINGS

DESCRIPTION OF PREFERRED EMBODIMENTS

The invention is now further described with reference to the following examples which are intended to demonstrate the utility of the invention. The examples are not however intended to imply any necessary limitations on the scope of the invention.

EXAMPLE 1

This Example details the production and evaluation of a coated tool with an engineered surface made according to the process described in U.S. Pat. No. 5,833,724 A paper supplied by Monadnock Paper Company with a weight/m$^2$ of 105 gm is used as the backing or substrate material. Formulations comprising a binder and an abrasive dispersed in the binder were prepared according to the following recipes:

| FORM. | MASS PERCENTAGES OF COMPONENTS | | | | | |
|---|---|---|---|---|---|---|
|  | CeO$_2$ | Al$_2$O$_3$ | ATH | BINDER* | I-819 | A-1100** |
| Comp-1 | 0 | 54.7 | 16.7 | 25.2 | 1.69 | 1.69 |
| Invention | 5.5 | 50.00 | 13.7 | 25.2 | 1.69 | 1.69 |
| Comp-2 | 61.1 | 0 | 10.3 | 25.2 | 1.69 | 1.69 |

In the above formulation "Comp-1" 100% of the abrasive is seeded sol-gel alumina with a mean particle size of 0.24 micrometer. In "Comp-2" the abrasive was 100% ceria with a mean particle size of 2 micrometers. The formulation indicated as "Invention" contained as the abrasive component the abrasive components found in the Comp-1 and Comp-2 formulations in a 90:10 ratio.

"ATH" refers to aluminum trihydrate which is acts as a filler for the formulation. The "Binder" used in each formulation was a blend of 70% by weight of an acrylated epoxy oligomer sold by UCB Radcure Inc. under the Trademark "EBECRYL® 3700" with 30% by weight of trimethylolpropane triacrylate, (TMPTA).

"I-819" refers to a photopolymerization accelerator sold by Ciba under the trademark "IRGACURE®-819". "A-1100" is in fact a blend of 50% by weight of A-1100 aminosilane (sold by Silquest) with 37.5% by weight of isopropyl acetate and 12.5% by weight of water All three formulations had a viscosity of 11,000 cP (+/−500 cP) at 100° F.

Each formulation was coated to a depth of 9 mils (0.223 mm) on the paper substrate. The slurry layer was then coated with a powder layer of 9 micrometer calcined alumina and a 40 lines per inch trihelical pattern was embossed on the slurry layer which was then cured using UV-light.

Figure 1:
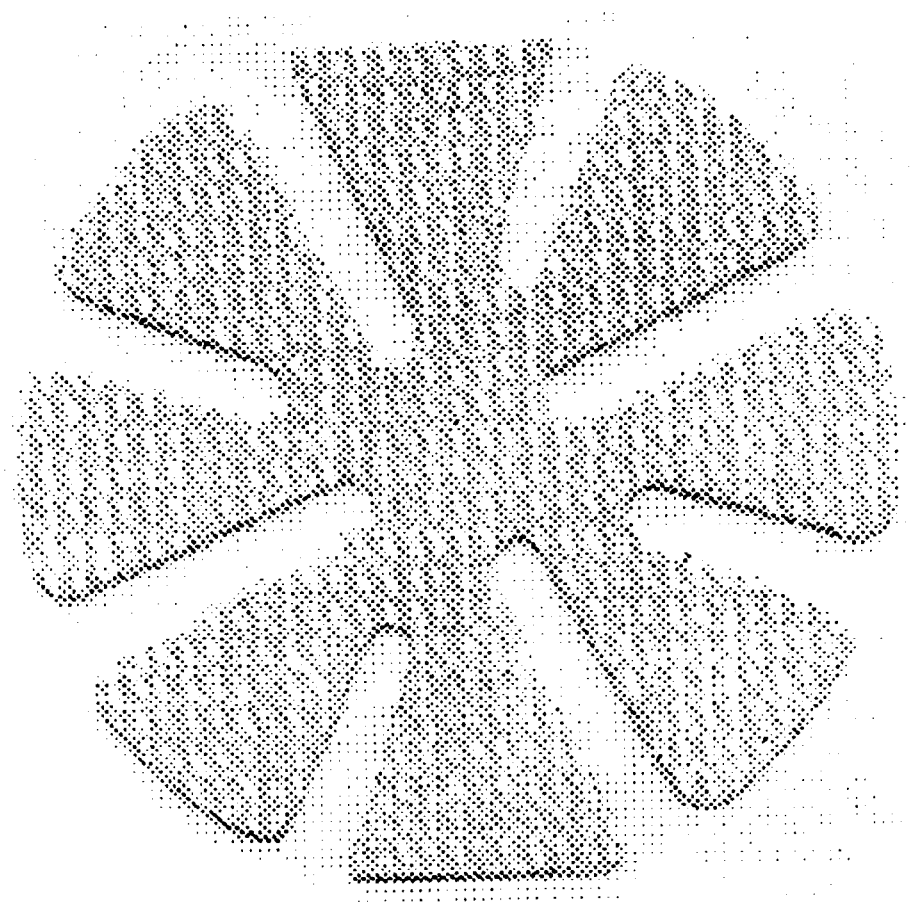
FIG. 1 is a plan view of a "snowflake" pad with an engineered abrasive surface.

Snowflake rosette discs, (as shown in FIG. 1 of the Drawings), were cut from the cured product and these were evaluated on a Surfacer machine supplied by Coburn Optical. The test conditions, which were the same for all the products tested, were five minutes polishing on a glass ophthalmic lens with a 7.25 inch (18.4 cm) curvature under an applied pressure of 20 psi. Surface finish and stock removal were measured after 100, 200, and 300 seconds. The results appear in FIGS. 2 and 3 respectively of the attached Drawings.

Figure 2:
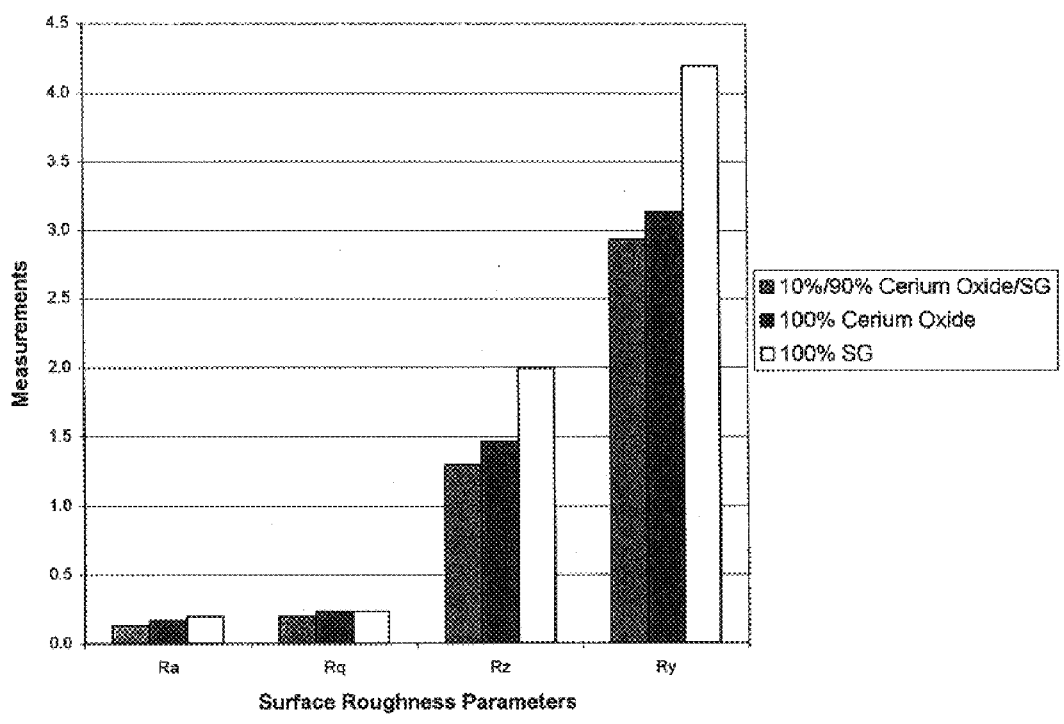
FIG. 2 is a bar graph representation of the surface roughness in terms of micrometers for a product according to the invention and two comparative products
Figure 3:
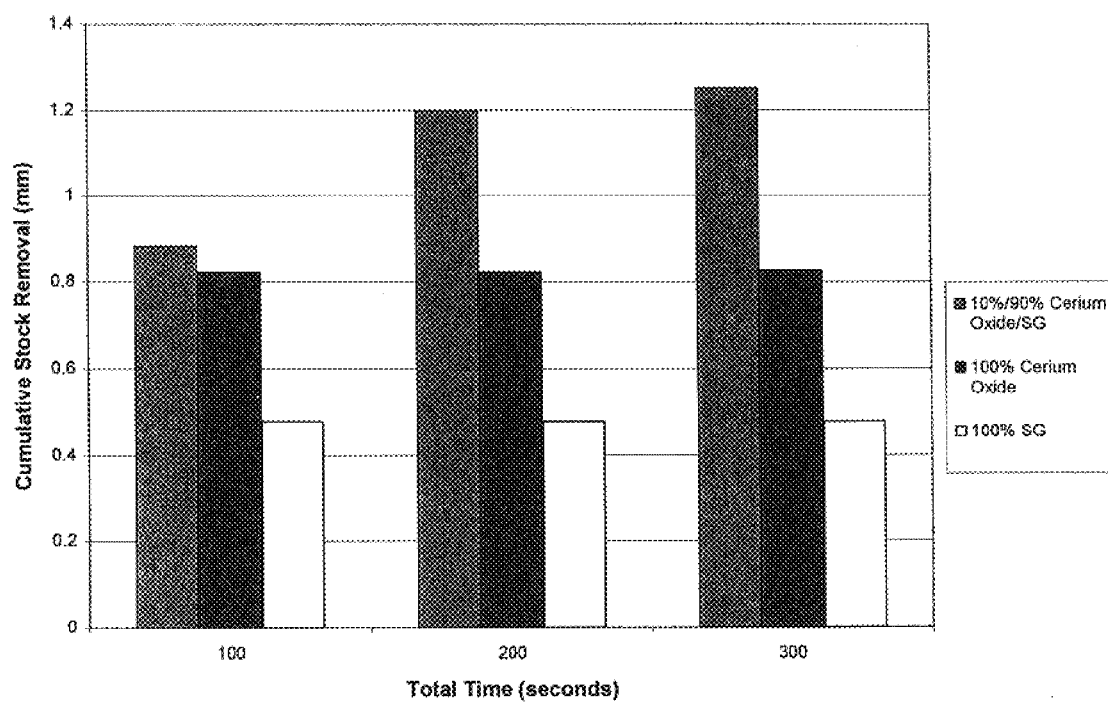
FIG. 3 is a second bar chart relating to the same products shown in FIG. 1 with the comparison made in terms of stock removal over standard polishing periods.

In the FIG. 2, the various surface finish parameters commonly used are set forth for each disc in the form of bar graphs for $R_a$, (average of the measured roughness profile height deviations, taken within a standard length and measured from the mean line); $R_q$, (the root mean square parameter corresponding to $R_a$; $R_z$, (The mean roughness depth which is the mean of the maximum peak to valley roughnesses in five successive sampling lengths; and $R_y$, (which is the non-adjacent maximum height of roughness profile).

As will be obvious from the Drawings, an extremely surprising effect was observed. There was little difference between the roughness of the glasses polished using ceria and the glass polished using the ceria/alumina mixture but the 100% alumina disc left an increasingly rough surface when measured using the $R_z$ and $R_y$ parameters. However the stock removal comparison went in a completely surprising direction. Rough finish usually correlates with rapid stock removal. In this case however the opposite is found to be true. The disc with the component mixture clearly outperformed either component used alone in both stock removal and was at least equal to or better than the ceria in terms of surface finish.

To make a coated abrasive with an engineered surface, a layer of the above formulation is laid on the paper substrate using a knife coating technique with a smoothing bar and a further thin layer of 9 micron alpha alumina is added over the top surface. This coated product is then passed under an embossing roll having hexagonal cells engraved therein. The dimensions of the cells are 560 microns in depth, 1000 micron sides at the top and 100 microns at the bottom. The cells are closely grouped so as to create 17 lines of cells per centimeter and the lines are slightly offset in the direction of intended travel during polishing to avoid leaving scratch marks. The binder resin is then at least partially cured by exposure to UV light directly it exits the embossing station. After completion of the cure the product has an engineered surface capable of polishing optical glass.

What is claimed is:

1. An optical polishing tool which comprises alpha alumina particles and ceria particles in an alumina to ceria mass ratio of from 95:5 to 80:20 dispersed in a hardened resin binder.

2. An optical polishing tool according to claim 1 in the form of a coated abrasive.

3. An optical polishing tool according to claim 2 in which the coated abrasive comprises a plurality of individual spaced abrasive containing structures.

4. An optical polishing tool according to claim 3 in which the structures provide a surface pattern and each such structure in the pattern has a cross-sectional area that diminishes with distance from a backing to which the structures are bonded.

5. An optical polishing tool according to claim 1 in which the alpha alumina particles have a mean particle size of 0.5 micrometers or less.

6. An optical polishing tool according to claim 1 in which the alpha alumina is a seeded sol-gel alumina.

7. An optical polishing tool according to claim 1 in which the ceria particles have a mean particle sizes of from 0.2 to 4 micrometers.

8. An optical polishing tool according to claim 1 in which the tool comprises a backing material on which the abrasive particles dispersed in a hardened resin binder are deposited and the backing material is selected from the group consisting of paper and film.

9. An optical polishing tool according to claim 1 in which the binder is a radiation-curable resin.

10. An optical polishing tool according to claim 4 in which the tool is a coated product in which the binder further comprises an adhesion control additive.

11. An optical polishing tool according to claim 4 in which the surface has been treated with a layer of a functional powder.

12. An optical polishing tool according to claim 11 in which the functional powder comprises an abrasive powder selected from the group consisting of the abrasives used in the formulation of the abrasive-contains structures and mixtures thereof.

13. An optical polishing tool according to claim 12 in which an abrasive powder present as a component of the functional powder has a coarser particle size than the corresponding component in the abrasive-containing structures.

14. An optical polishing tool according to claim 11 in which the functional powder comprises a grinding aid.

* * * * *